United States Patent [19]

Aoki et al.

[11] Patent Number: 5,785,374

[45] Date of Patent: Jul. 28, 1998

[54] WINDSCREEN BRACKET FOR A MOTORCYCLE

[75] Inventors: Hiroyuki Aoki, Rancho Palos Verdes; Martin Manchester, Long Beach; Timothy Prentice, Hermosa Beach; Masanori Aoki, Rancho Palos Verdes, all of Calif.

[73] Assignee: Honda Giken Kogyo Kabushiki Kaisha, Tokyo, Japan

[21] Appl. No.: 613,587

[22] Filed: Mar. 12, 1996

Related U.S. Application Data

[60] Provisional application No. 60/001,294, Jul. 20, 1995.
[51] Int. Cl.$^6$ ...................................... B62J 17/00
[52] U.S. Cl. ............................................ 296/78.1
[58] Field of Search .................... 296/78.1; D12/110; 280/288.4

[56] References Cited

U.S. PATENT DOCUMENTS

| D. 275,470 | 9/1984 | Koizumi. | |
| D. 305,748 | 1/1990 | Kaneko et al. | D12/110 |
| 2,903,297 | 9/1959 | Zbikoski | 296/78.1 |
| 4,082,345 | 4/1978 | Willey | 296/78.1 |
| 4,334,589 | 6/1982 | Asakura et al. | |
| 4,709,774 | 12/1987 | Saito et al. | |

*Primary Examiner*—Jesus D. Sotelo
*Attorney, Agent, or Firm*—Birch, Stewart, Kolasch & Birch, LLP

[57] ABSTRACT

A windscreen support structure for a motorcycle includes a windscreen bracket having a first end and a distal end, the first end is connected to a portion of a frame of a motorcycle. A first windscreen plate is affixed to the distal end of the windscreen bracket, the first windscreen plate extends in a traverse direction relative to the windscreen bracket and includes first and second support projections displaced relative to each other and being substantially orthogonally mounted relative to the first windscreen plate. A second windscreen plate is secured to the first windscreen plate for mounting a windscreen therebetween. The second windscreen plate extends in a traverse direction relative to the windscreen bracket and includes first and second support projections displaced relative to each other and being aligned relative to the first windscreen plate. Connecting members are provided for securing the first and second windscreen plates relative to each other for mounting a windscreen therebetween.

24 Claims, 7 Drawing Sheets

WINDSCREEN BRACKET FOR A MOTORCYCLE

This application incorporates by reference and claims the benefit of U.S. Provisional application Ser. No. 60/001,294 filed Jul. 20, 1995.

BACKGROUND OF THE INVENTION

1. Field of the Invention

A windscreen support structure is provided for mounting a windscreen bracket directly on a frame of a motorcycle for retaining a windscreen relative thereto.

2. Description of Background Art

Fairings, headlights, turn signals and windscreens may be mounted on either the front forks of a motorcycle or on the frame of a motorcycle. A number of prior windscreens have been mounted onto a motorcycle by affixing the windscreen directly to the forks utilized to mount the front wheel to the motorcycle. As the motorcycle is turned, the windscreen will turn in the same direction as the front wheel.

Current frame mounted fairings are designed to offer maximum wind protection for the rider. Most of the fairings are used on touring motorcycles or racing motorcycles. The typical body fairing will encircle the front forks and be attached at three points to the frame. One of the points of attachment will be to the head pipe and one on each side of the main frame. The fairing normally incorporates the headlight, windscreen, turn signals and instrument clusters. The fairings are very prominent due to the functional requirements of the various elements comprising the fairings. The extreme degree of wind protection is not required for motorcycles, such as custom motorcycles, that are only occasionally used for open road and/or high speed touring.

Many fork mounted elements such as headlights, turn signals and fairings employ prominent brackets, usually constructed of chrome. Modifying a motorcycle by mounting a fairing to the fork while retaining the conventional mounting structure for the headlights, turn signals and fairings will result in drastically altering the original style of the motorcycle.

OBJECTS AND SUMMARY OF THE INVENTION

The present invention is directed to providing a retrofit to permit a windscreen to be added to a custom motorcycle. A custom motorcycle is a traditional motorcycle which is very simple in design. Such a motorcycle lacks integration of the various parts such as the tank, handle bars, seats, saddlebags, etc. Each of these elements stands on its own. Each part of a custom motorcycle must have character.

Custom motorcycles are basically used on urban roads so wind protection is not a critical necessity. Most custom motorcycles do not have fairings or windscreens. However, custom motorcycle may be used where some wind protection is desirable. The addition of a clear fairing or windscreen to an existing custom motorcycle cannot upset the original styling. Thus, prominent frame mounted fairings used for sport motorcycles and touring motorcycles are not able to be used together with a custom motorcycle.

The present invention provides a windscreen support structure for a motorcycle wherein a windscreen bracket includes a first end and a distal end. The first end is adapted to be connected to a portion of a frame of the motorcycle. A first windscreen plate is affixed to the distal end of the windscreen bracket. The first windscreen plate extends in a transverse direction relative to the windscreen and includes first and second support projections displaced relative to each other and being substantially orthogonally mounted relative to the first windscreen plate. A second windscreen plate is adapted to be secured to the first windscreen plate for mounting a windscreen therebetween. The second windscreen plate extends in a transverse direction relative to the windscreen bracket and includes first and second projections displaced relative to each other and being aligned relative to the first windscreen plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
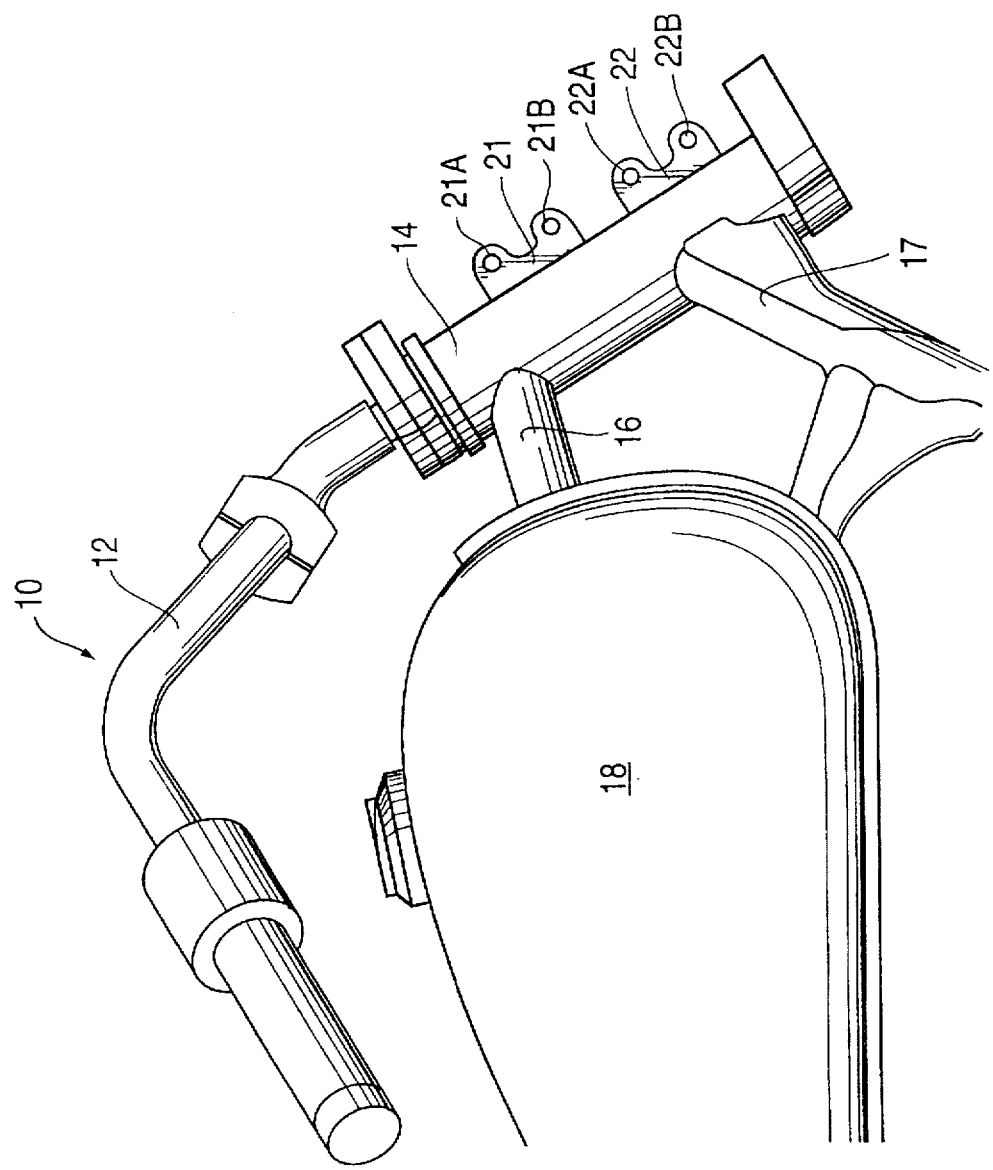
FIG. 1 is a side view illustrating stay brackets affixed to a head pipe of a motorcycle.
Figure 2:
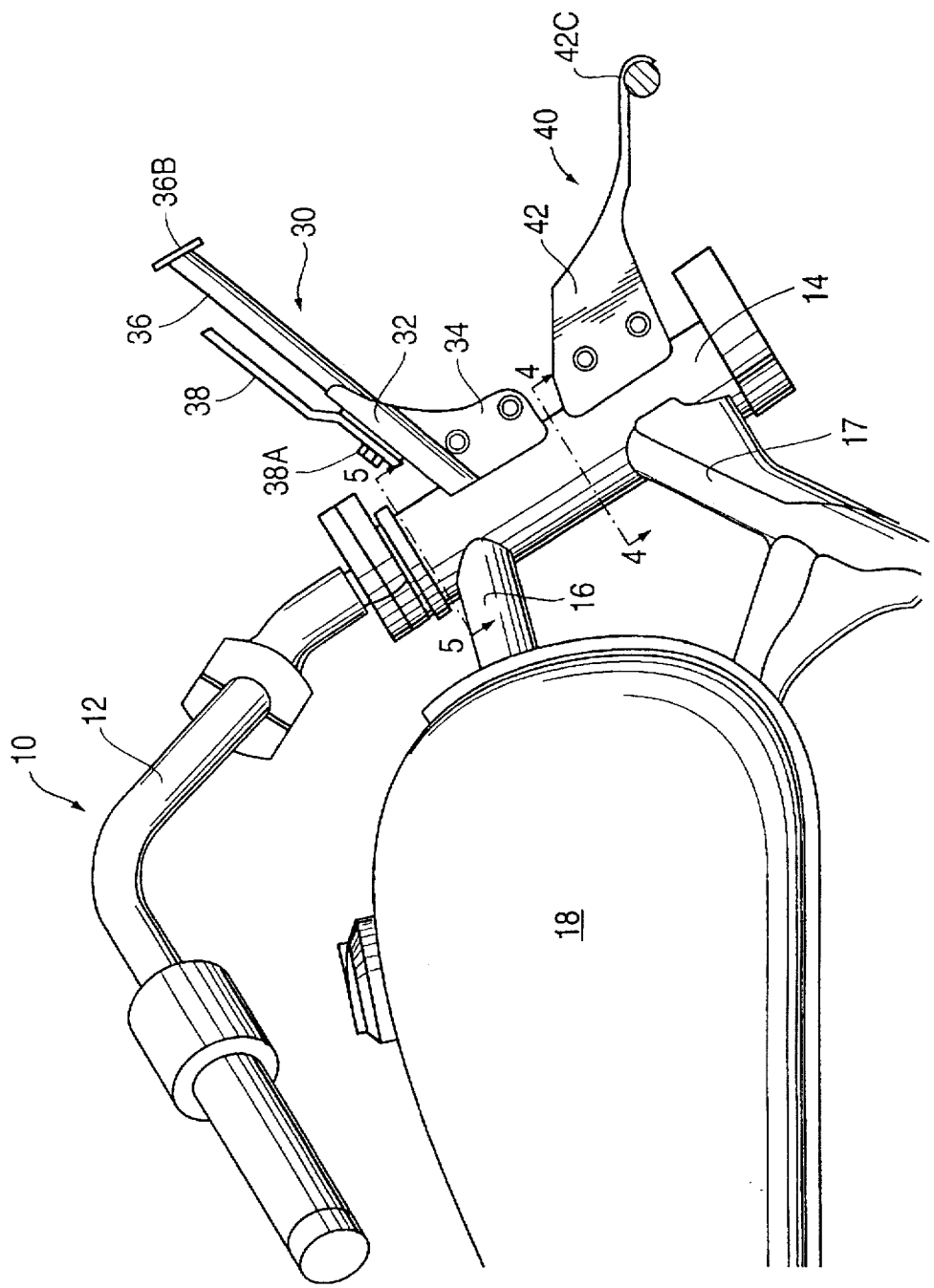
FIG. 2 is a side view illustrating the headlight bracket, windscreen bracket and speedometer bracket attached to stay bracket.
Figure 3:
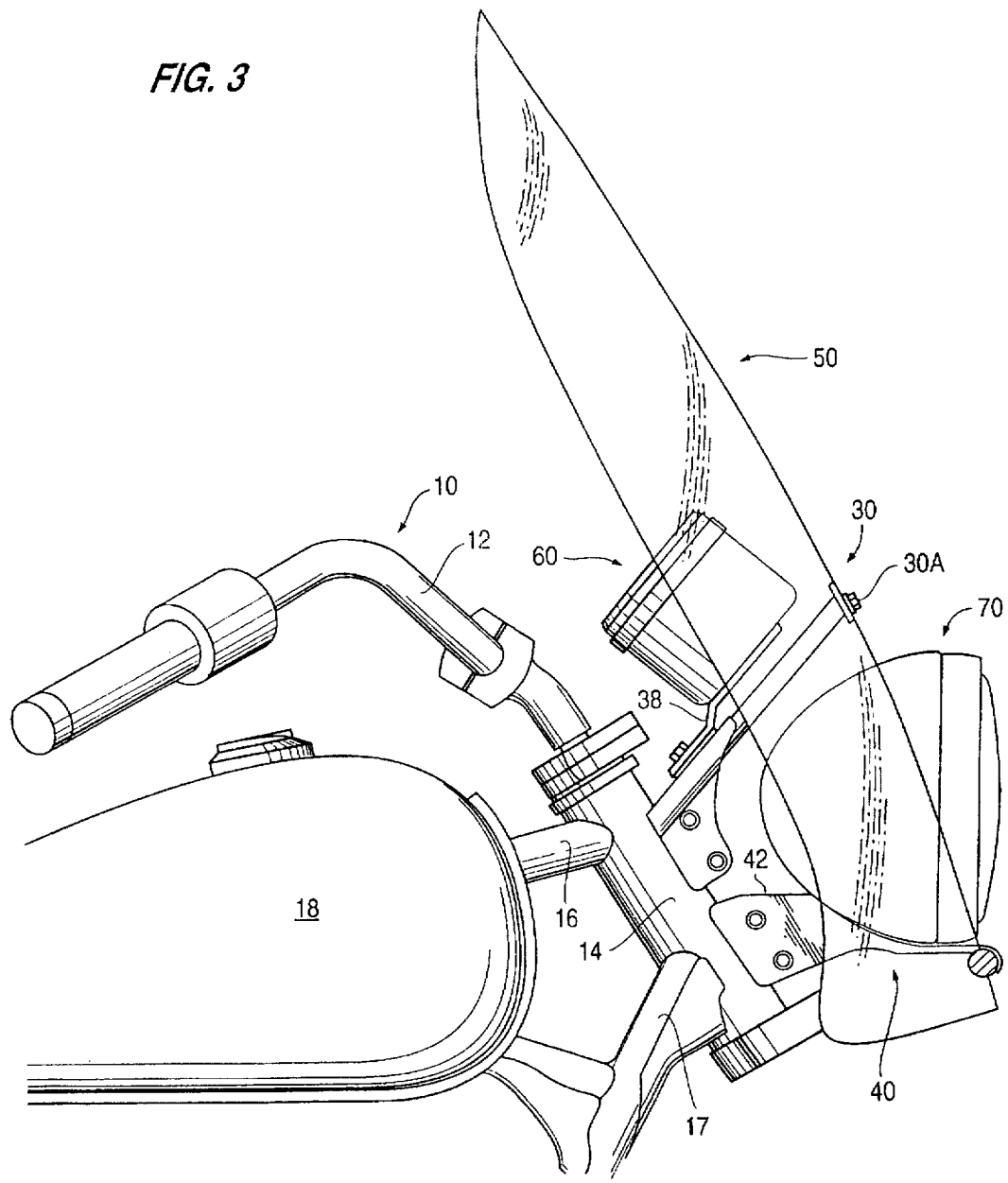
FIG. 3 is a side view illustrating the headlight, windscreen and speedometer affixed to the various brackets.

As illustrated in FIGS. 1-3, a motorcycle 10 includes a handle bar 12 operatively secured for rotation within a head pipe 14. The head pipe 14 forms part of the frame of a motorcycle which includes an upper support structure 16 and a lower support structure 17. A fuel tank 18 is secured to the upper and lower support structures 16, 17 of the frame of the motorcycle. Stay brackets 21, 22 are secured to the head pipe 14. The stay brackets 21, 22 may be welded to the head pipe 14 to ensure accurate positioning of the stay brackets 21, 22 relative to the head pipe 14. Stay bracket 21 includes apertures 21A, 21B. Similarly, stay bracket 22 includes apertures 22A, 22B. The apertures 21A, 21B, 22A, 22B are provided for securing various components to the head pipe 14 of the motorcycle 10.

As illustrated in FIG. 2, a windscreen bracket 30 includes a plate 32 having a downwardly extending second portion 34. A first member 36 includes a first end 36A secured to the plate 32 and a distal end 36B adapted to be secured to a first windscreen plate. A speedometer bracket 38 is secured to the plate 32 by means of a screw 38A.

A turn signal bracket 40 is secured to the stay 22 by means of a plate 42. Support member 44 is secured to an end 42C of the plate 42 for mounting the turn signals relative to the head pipe 14 of the motorcycle 10.

As illustrated in FIG. 3, a windscreen 50 is secured to the bracket 30 by means of a plurality of bolts. One bolt 30A is illustrated in FIG. 3 which comprises a side view of the present invention.

A speedometer 60 is secured to the speedometer bracket 38 to permit an individual to determine the speed of the motorcycle during operation. A headlight 70 is secured to the turn signal bracket plate 42 for permitting an individual to illuminate a predetermined area during use of the motorcycle.

Figure 4:
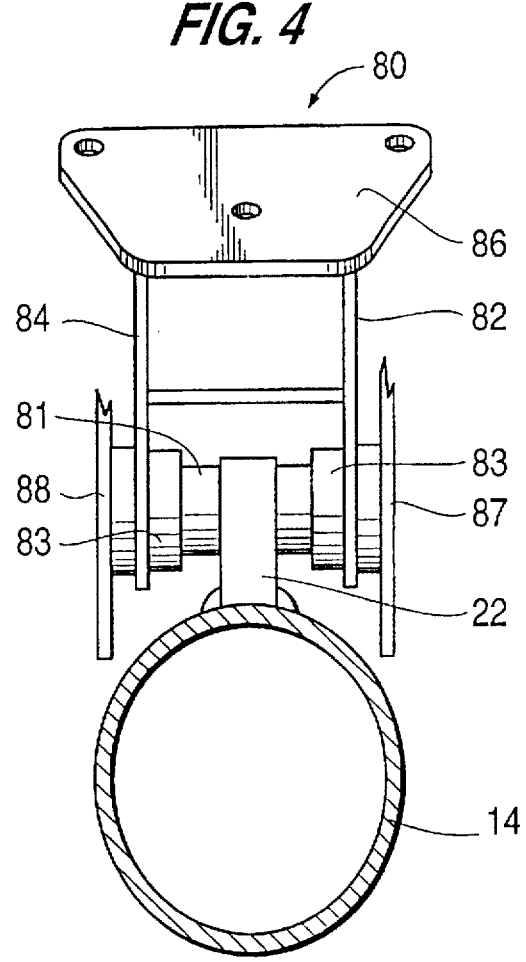
FIG. 4 is a cross-sectional view taken along line 4—4 illustrated in FIG. 2.

FIG. 4 illustrates a partial cross-sectional view taken along line 4—4 of FIG. 2. Stay bracket 22 is secured to the head pipe 14 by means of welding. A headlight bracket 80 is provided which includes two arms 82, 84 which are secured to a plate 86. The two arms 82, 84 are mounted relative to the stay bracket 22 by means of a collar 81 and rubber grommets 83. Side walls 42A, 42B of a turnsignal bracket are provided adjacent the sides of the rubber grommets 83.

Figure 5:
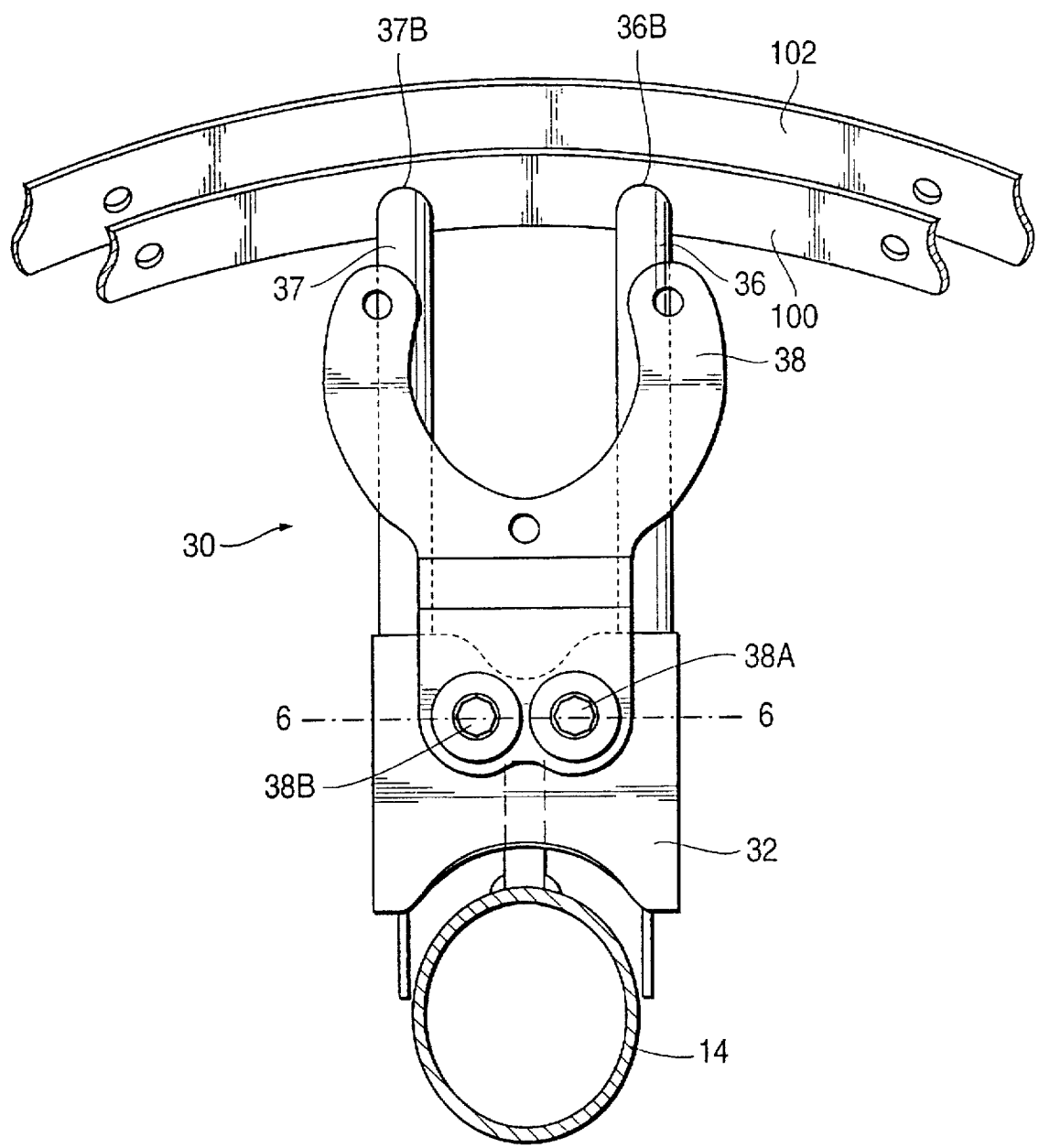
FIG. 5 is a cross-sectional view taken along line 5—5 illustrated in FIG. 2.

FIG. 5 is a cross-sectional view taken along line 5—5 of FIG. 2. The stay bracket 21 is illustrated as being welded relative to the head pipe 14. The windscreen bracket 30 includes a first member 36 and a second member 37 secured to the plate 32. A distal end 36B of the first member 36 and a distal end 37B of the second member 37 are secured to a first windscreen plate 100. A second windscreen plate 102 is mounted relative to the first windscreen plate 100. A windscreen is designed to be secured between the first windscreen plate 100 and the second windscreen plate 102. A speedometer bracket 38 is secured to the plate 32 by means of bolts 38A, 38B.

Figure 6:
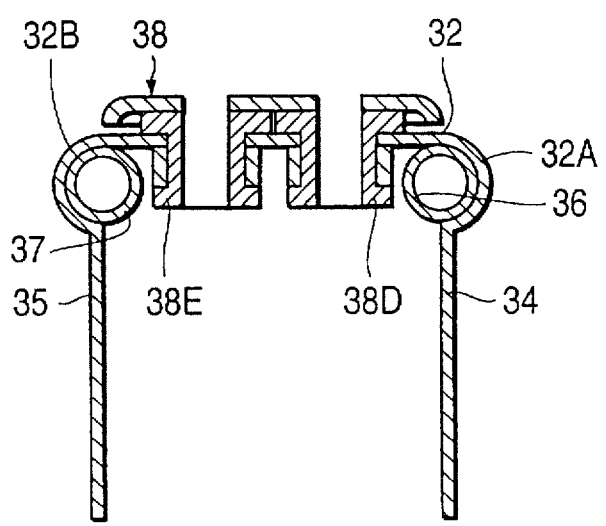
FIG. 6 is a sectional view taken along line 6—6 of FIG. 5 wherein the bolts for securing the speedometer bracket to the windscreen bracket and the integral collars on the windscreen bracket have been eliminated for simplicity.

FIG. 6 illustrates cross-sectional view taken along line 6—6 of FIG. 5. The plate 32 includes an upper first portion and downwardly projecting second and third portions 34, 35. The second and third portions 34, 35 are spaced relative to each other. The first member 36 and second member 37 which form the windscreen bracket 30 are mounted adjacent to the plate 32 and the second and third portion 34, 35, respectively. The plate 32 is curved to includes sections 32A, 32B for mating with the exterior curved portions of the first and second members 36, 37.

The speedometer bracket 38 is secured to the plate 32 by means of rubber bushings 38D, 38E. As illustrated in FIG. 5, bolts 38A, 38B are designed to project through apertures in the speedometer bracket 38 for securing the speedometer bracket 38 relative to the plate 32.

Figure 7:
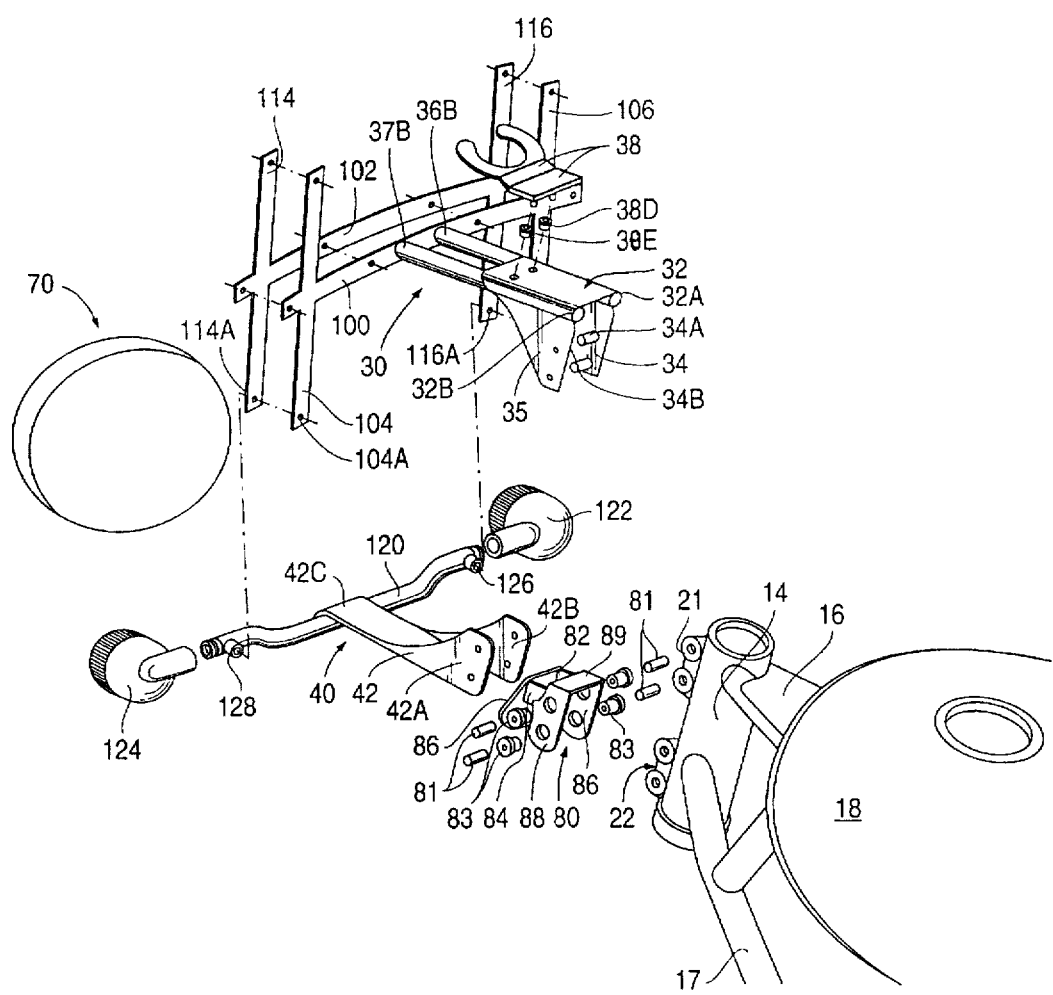
FIG. 7 is an exploded view illustrating the various components of the present invention, with the threaded fasteners omitted for simplicity.

FIG. 7 is an exploded view of the various components of the present invention. The windscreen bracket includes the first and second members 36, 37 which are disposed within the curved section 32A, 32B of the plate 32. The plate 32 includes downwardly projecting second and third portions 34, 35. Integral collars 34A, 34B are secured to the downwardly projecting portion 34. The downwardly projecting third portion 35 also includes integral collars, not illustrated in FIG. 7. The speedometer bracket 38 is secured to the plate 32 by means of bolts and rubber bushings 38D, 38E. The distal ends 36B, 37B of the first and second members 36, 37 are secured to the first windscreen plate 100. The first windscreen plate 100 is includes a first support projection 104 and a second support projection 106 which are displaced relative to each other and substantially orthogonally arranged relative to the first windscreen plate 100. A second windscreen plate 102 includes first and second support projections 114, 116 which are displaced relative to each other and are substantially orthogonally arranged relative to the second windscreen plate 102. The first windscreen plate 100 and the first and second support projections 104, 106 are aligned with the second windscreen plate 102 and the first and second support projections 114, 116 to permit bolts to be secured relative thereto. A windscreen is designed to be mounted between the first windscreen plate 100 and the second windscreen plate 102. The first and second support projections 104, 106 of the first windscreen plate 100 and the first and second support projections 114, 116 of the second windscreen plate 102 provide a secure mounting for the windscreen relative to the head pipe 14 of a motorcycle.

The headlight bracket 80 includes arms 82, 84 which are mounted to the mounting plate 86 and include an upper plate member 89. Rubber bushings 83 are mounted through apertures in the arms 82, 84. Collars 81 are inserted through the rubber grommets 83. The collars and rubber grommets are designed to provide openings for receiving bolts for securing the turn signal bracket 40 and the headlight bracket 80 relative to the stay bracket 22. The turn signal bracket 40 includes side walls 42A, 42B and a distal end 42C. The side walls 42A, 42B are designed to be disposed adjacent to the arms 82, 84 for providing a rigid construction relative to the headlight bracket 80 and the turn signal bracket 40. In this way, the turn signal bracket 40 and the headlight bracket 80 may be securely mounted relative to the stay bracket 22 for affixing the elements relative to the head pipe 14.

The distal end 42C is secured to a support member 120 for mounting the right turn signal 122 and the left turn signal 124 relative to the turn signal bracket 40. A collar 126 is mounted on the support member 120 adjacent to the right turn signal 122. A collar 128 is mounted on the support member 120 adjacent to the left turn signal 124. The first support projections 104, 114 of the first and second windscreen plates 100, 102, respectively, include apertures 104A, 114A, respectively, which are designed to be secured to the collar 128 mounted on the support member 120. Similarly, an aperture 116A is provided in the second support projection 116 and a similar aperture is provided in the second support projection 106 which are designed to be secured relative to the collar 126 mounted on the support member 120. In this way, the windscreen secured between the first windscreen plate 100 and the second windscreen plate 102 are mounted rigidly to the turn signal bracket 40 which is secured to the head pipe 14 for providing a positive connection between the windscreen and the motorcycle.

Figure 8:
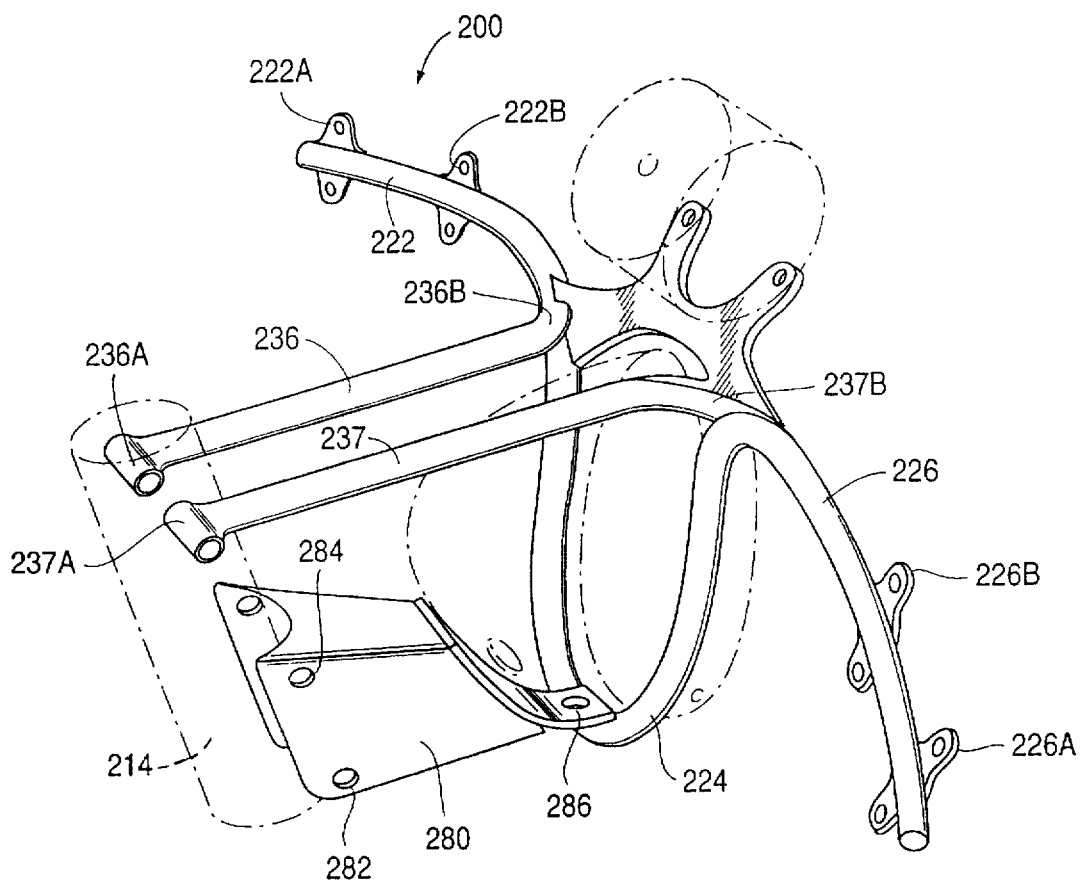
FIG. 8 is a perspective view of a second embodiment of the present invention illustrating the headlight, windscreen and speedometer brackets integrated together.

FIG. 8 illustrates another embodiment of the present invention wherein a head pipe 214 of a motorcycle is illustrated in phantom lines. The windscreen bracket 230 includes a first member 236 and a second member 237. The first and second members 236, 237 include first ends 236A, 237A, respectively, secured to the head pipe 214. A distal end 236B, 237B is secured to a windscreen support 200. The windscreen support 200 includes a first portion 222 extending to the left of the motorcycle. A lower portion 224 extends from the first portion 222. A right portion 226 extends from the lower portion 224. The distal ends 236B, 237B are secured to the left portion 222 and the right portion 226 for mounting the windscreen support 200 relative to the head pipe 214. A speedometer bracket 238 is secured to the left member 222 and the right member 226 of the windscreen support 200.

A headlight bracket 280 includes apertures 282, 284 for mounting the headlight bracket 280 relative to the head pipe 214. A support 286 extends from the headlight bracket 280 for affixing the headlight bracket 280 relative to the lower portion 224 of the windscreen support 200.

The left portion 222 of the windscreen support 200 includes first and second support projections 222A, 222B spaced relative to each other. Apertures are provided in the support projections 222A, 222B for affixing a windscreen relative to the windscreen support 200. Similarly, the right portion 226 includes first and second projections 226A, 226B which are displaced relative to each other. The first and second projections 226A, 226B include apertures therein for securing the windscreen relative to the windscreen support 200.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windscreen support structure for a motorcycle comprising:
   a windscreen bracket having a first end and a distal end, said first end being adapted to be connected to a portion of a frame of a motorcycle;
   a first windscreen plate having a middle portion affixed to said distal end of said windscreen bracket, said first windscreen plate extends in a traverse direction relative to said windscreen bracket and includes first and second support projections displaced relative to each other and being substantially orthogonally mounted relative to said first windscreen plate; and
   a second windscreen plate is secured to said first windscreen plate for mounting a windscreen therebetween said second windscreen plate extends in a traverse direction relative to said windscreen bracket and includes first and second support projections displaced relative to each other and being aligned relative to said first windscreen plate.

2. The windscreen support structure for a motorcycle according to claim 1, wherein said windscreen bracket includes a plate having a first portion, a second portion and a third portion, said second and third portions extending downwardly from said first portion and defining a space therebetween.

3. The windscreen support structure for a motorcycle according to claim 2, wherein said windscreen bracket includes a first member and a second member each including a first end and a distal end, said first end of said first and second members being secured to said plate and said distal end of said first and second members being secured to said first windscreen plate.

4. The windscreen support structure for a motorcycle according to claim 2, wherein said second and third portions of said plate include collars projecting within the space defined therebetween for enabling attachment of said windscreen bracket to a frame of a motorcycle.

5. The windscreen support structure for a motorcycle according to claim 2, wherein a connection between said first portion of said plate and said second and third portions is curved for accommodating a cylindrical configuration of the first and second members of said windscreen bracket.

6. The windscreen support structure for a motorcycle according to claim 1, wherein said first and second support projections of said first windscreen plate extend a greater predetermined distance substantially orthogonally from said first windscreen plate relative to a distance said first windscreen plate extends from said windscreen bracket.

7. The windscreen support structure for a motorcycle according to claim 6, wherein said first windscreen plate includes a first side and a second side, said first and second projections extend from both said first and second sides of said first windscreen plate to form a substantially H-shape.

8. The windscreen support structure for a motorcycle according to claim 1, wherein said first and second support projections of said second windscreen plate extend a greater predetermined distance substantially orthogonally from said second windscreen plate relative to a distance said second windscreen plate extends from said windscreen bracket.

9. The windscreen support structure for a motorcycle according to claim 8, wherein said second windscreen plate includes a first side and a second side, said first and second projections extend from both said first and second sides of said second windscreen plate to form a substantially H-shape.

10. The windscreen support structure for a motorcycle according to claim 1, and further including a headlight bracket adapted to be connected to a portion of a frame of a motorcycle adjacent to the point of connection of said windscreen bracket and at a point displaced a predetermined distance relative to the point of connection of said windscreen bracket.

11. The windscreen support structure for a motorcycle according to claim 1, and further including a turn signal bracket adapted to be connected to a portion of a frame of a motorcycle adjacent to the point of connection of said windscreen bracket and at a point displaced a predetermined distance relative to the point of connection of said windscreen bracket, said turn signal bracket including collars for mounting said first and second support projections of said first and second windscreen plates relative thereto.

12. The windscreen support structure for a motorcycle according to claim 1, and further including a stay bracket affixed to a head pipe of a motorcycle and projecting a predetermined distance therefrom for mounting said windscreen bracket relative thereto.

13. The windscreen support structure for a motorcycle according to claim 1, and further including connecting means for securing said first and second windscreen plates relative to each other for mounting a windscreen therebetween.

14. A windscreen support structure for retrofitting a windscreen to a motorcycle comprising:
   at least one stay bracket affixed to a head pipe of a motorcycle;
   a windscreen bracket having a first end and a distal end, said first end being adapted to be connected to said at least one stay bracket; and
   a windscreen plate affixed to said distal end of said windscreen bracket, said windscreen plate extends in a traverse direction relative to said windscreen bracket and includes first and second support projections displaced relative to each other and being substantially orthogonally mounted relative to said windscreen plate.

15. The windscreen support structure according to claim 14, and further including a second windscreen plate secured to said windscreen plate for mounting a windscreen therebetween said second windscreen plate extends in a traverse direction relative to said windscreen bracket and includes first and second support projections displaced relative to each other and being aligned relative to said windscreen plate.

16. The windscreen support structure according to claim 15, wherein said first and second support projections of said second windscreen plate extend a greater predetermined distance substantially orthogonally from said second windscreen plate relative to a distance said second windscreen plate extends from said windscreen bracket.

17. The windscreen support structure according to claim 16, wherein said second windscreen plate includes a first side and a second side, said first and second projections extend from both said first and second sides of said second windscreen plate to form a substantially H-shape.

18. The windscreen support structure according to claim 14, wherein said windscreen bracket includes a plate having a first portion, a second portion and a third portion, said second and third portions extending downwardly from said first portion for defining a space therebetween.

19. The windscreen support structure according to claim 18, wherein said windscreen bracket includes a first member and a second member each including a first end and a distal end, said first end of said first and second members being secured to said plate and said distal end of said first and second members being secured to said windscreen plate.

20. The windscreen support structure according to claim 14, wherein said first and second support projections of said windscreen plate extend a greater predetermined distance substantially orthogonally from said windscreen plate relative to a distance said windscreen plate extends from said windscreen bracket.

21. The windscreen support structure according to claim 20, wherein said windscreen plate includes a first side and a second side, said first and second projections extend from both said first and second sides of said windscreen plate to form a substantially H-shape.

22. The windscreen support structure according to claim 14, and further including a headlight bracket adapted to be connected to a portion of a frame of a motorcycle adjacent to the point of connection of said windscreen bracket and at a point displaced relative to the point of connection of said windscreen bracket.

23. The windscreen support structure according to claim 14, and further including a turn signal bracket adapted to be connected to a portion of a frame of a motorcycle adjacent to the point of connection of said windscreen bracket and at a point displaced a predetermined distance relative to the point of connection of said windscreen bracket, said turn signal bracket including collars for mounting said first and second support projections of said windscreen plates relative thereto.

24. The windscreen support structure according to claim 14, and further including connecting means for securing said windscreen plate relative to a windscreen.

* * * * *